(12) United States Patent
Fife et al.

(10) Patent No.: US 9,852,214 B2
(45) Date of Patent: Dec. 26, 2017

(54) SYSTEMS AND METHODS FOR AUTOMATIC PROGRAM RECOMMENDATIONS BASED ON USER INTERACTIONS

(71) Applicant: Rovi Guides, Inc., San Carlos, CA (US)

(72) Inventors: Brian Fife, Concord, MA (US); Jason Braness, San Diego, CA (US); Michael Papish, Randolph Center, VT (US); Thomas Steven Woods, Arlington Heights, IL (US)

(73) Assignee: Rovi Guides, Inc., San Carlos, CA (US)

( * ) Notice: Subject to any disclaimer, the term of this patent is extended or adjusted under 35 U.S.C. 154(b) by 93 days.

(21) Appl. No.: 15/078,639

(22) Filed: Mar. 23, 2016

(65) Prior Publication Data

US 2016/0205426 A1    Jul. 14, 2016

Related U.S. Application Data

(63) Continuation of application No. 14/716,602, filed on May 19, 2015, now Pat. No. 9,298,810, which is a (Continued)

(51) Int. Cl.
*G10L 21/00* (2013.01)
*G10L 25/00* (2013.01)
(Continued)

(52) U.S. Cl.
CPC ...... *G06F 17/30663* (2013.01); *G06F 3/0482* (2013.01); *G06F 3/04842* (2013.01); *G06F 17/27* (2013.01); *G06F 17/2705* (2013.01); *G06F 17/30029* (2013.01); *G06F 17/30846* (2013.01); *G10L 17/22* (2013.01); *H04L 67/306* (2013.01); *H04N 21/252* (2013.01); *H04N 21/25891* (2013.01); *H04N 21/4126* (2013.01); *H04N 21/442* (2013.01); *H04N 21/4532* (2013.01); *H04N 21/4667* (2013.01);
(Continued)

(58) Field of Classification Search
USPC ................................. 704/231–257, 270–275
See application file for complete search history.

(56) References Cited

U.S. PATENT DOCUMENTS 7,111,319 B1 *   9/2006   Watkins ................... H04N 5/76
                                                         348/E5.007
2004/0193426 A1 * 9/2004   Maddux ................ G06Q 30/02
                                                             704/275
(Continued)

*Primary Examiner* — Jesse Pullias
(74) *Attorney, Agent, or Firm* — Haley Guiliano LLP

(57) ABSTRACT

Methods and systems are provided for generating automatic program recommendations based on user interactions. In some embodiments, control circuitry processes verbal data received during an interaction between a user of a user device and a person with whom the user is interacting. The control circuitry analyzes the verbal data to automatically identify a media asset referred to during the interaction by at least one of the user and the person with whom the user is interacting. The control circuitry adds the identified media asset to a list of media assets associated with the user of the user device. The list of media assets is transmitted to a second user device of the user.

20 Claims, 10 Drawing Sheets

Related U.S. Application Data continuation of application No. 13/626,332, filed on Sep. 25, 2012, now Pat. No. 9,092,415.

(51) Int. Cl.

| | | |
|---|---|---|
| G10L 15/00 | (2013.01) | |
| G06F 17/30 | (2006.01) | |
| G06F 3/0482 | (2013.01) | |
| G06F 3/0484 | (2013.01) | |
| G06F 17/27 | (2006.01) | |
| H04N 21/442 | (2011.01) | |
| H04N 21/45 | (2011.01) | |
| H04N 21/466 | (2011.01) | |
| H04N 21/482 | (2011.01) | |
| H04N 21/25 | (2011.01) | |
| H04N 21/258 | (2011.01) | |
| H04N 21/41 | (2011.01) | |
| H04N 21/472 | (2011.01) | |
| G10L 17/22 | (2013.01) | |
| H04L 29/08 | (2006.01) | |

(52) U.S. Cl.
CPC ... *H04N 21/4668* (2013.01); *H04N 21/47214* (2013.01); *H04N 21/4826* (2013.01)

(56) References Cited

U.S. PATENT DOCUMENTS

| | | | | |
|---|---|---|---|---|
| 2006/0235701 | A1* | 10/2006 | Cane | H04N 21/4126 704/275 |
| 2009/0271203 | A1* | 10/2009 | Resch | G10L 17/00 704/275 |
| 2009/0319276 | A1* | 12/2009 | Chang | G08C 17/00 704/275 |
| 2011/0004477 | A1* | 1/2011 | Bansal | H04N 5/781 704/275 |

* cited by examiner

900

Set Up Automated Recommendations

What should I do when I hear you discussing a program?

902 {
- ○ Set a Reminder
- ○ Record the Program
- ⦿ Add it to my Queue
- ○ Bookmark the Program
- ○ Send me a Link
- ○ Add it to a List of Recommendations

[ Next ] — 904

Set Up Automated Recommendations

In general, how many times should you discuss the program before I add it to your queue?

|—|—|—|—●—|—|—|—|—|—|—→
1  2  3  4  5  6  7  8  9  10

— 1002

[ Next ] — 1004

Set Up Automated Recommendations

Are there any contacts I should favor when making recommendations?

Selected:
- ⊗ Raquel
- ⊗ Mom  ╱— 1102
- ⊗ Jenny

[Select Another Contact ▼] ╱— 1104

[Next] ╱— 1106

Set Up Automated Recommendations

Are there any contacts I should ignore when making recommendations?

Selected:
- ⊗ Robert  ╱— 1202
- ⊗ Celia

[Select Another Contact ▼] ╱— 1204

[Next] ╱— 1206

| Automated Recommendations |

It sounds like you are interested in watching the Jets v. Patriots game scheduled for 4:25 on Sunday, October 21, 2012.

Would you like me to take any of the following actions?

1302 {
- ● Set a Reminder
- ○ Record the Program
- ○ Bookmark the Program
- ○ Send me a Link

[ Done ] — 1304  1306 — [ No, thanks ]

| Automated Recommendations |

It sounds like you are interested in watching Buffy the Vampire Slayer.

Would you like me to take any of the following actions?

1402 {
- ● Add Season 1 to my Queue
- ○ Bookmark the Program
- ○ Send me a Link

[ Done ] — 1404  1406 — [ No, thanks ]

FIG. 14

SYSTEMS AND METHODS FOR AUTOMATIC PROGRAM RECOMMENDATIONS BASED ON USER INTERACTIONS

CROSS REFERENCE TO RELATED APPLICATIONS

This application is a continuation of U.S. patent application Ser. No. 14/716,602, filed May 19, 2015, currently pending, which is a continuation of U.S. patent application Ser. No. 13/626,332, filed Sep. 25, 2012 (now U.S. Pat. No. 9,092,415), each of which is hereby incorporated by reference herein in its entirety.

BACKGROUND

Modern consumers often carry one or more personal electronic devices, such as mobile phones, smart phones, tablet computers, etc., with them at all times. Typical personal electronic devices have a network connection to a cell phone network or the Internet, for example, so that users can communicate with other users. Recently, personal electronic devices have also begun to incorporate voice recognition technology to take spoken commands from their users and perform actions based on the commands and image recognition technology to identify images captured by the devices.

As users go throughout their day, they often are told about media content they may be interested in, such as television programs, videos, movies, songs, and albums. Such discussions may occur in conversations over a network using the personal electronic device or in an in-person conversation in close proximity to a user's personal electronic device. At present, users have to manually create reminders or notes to recall these recommendations. However, creating reminders or notes is time consuming and often inconvenient, causing to users to forgo the effort and instead quickly forget the recommendations. In addition, multiple different people may recommend a particular media asset to a user without the user noticing that multiple people have endorsed it.

SUMMARY

In order to make automatic recommendations to a user based on his interactions with other people, methods and systems are provided herein for recommending a media asset based on a monitored interaction. By automating the steps of identifying a media asset referred to during a user's interaction with another person and adding the identified media asset to a list of media assets associated with the user, a user can avoid missing out on media assets recommended to him by his friends and family.

Herein, control circuitry processes verbal data received during an interaction between a user of a user device and a person with whom the user is interacting. The control circuitry analyzes the verbal data to automatically identify a media asset referred to during the interaction by at least one of the user and the person with whom the user is interacting. The control circuitry adds the identified media asset to a list of media assets associated with the user of the user device. The list of media assets is transmitted to a second user device of the user.

In some embodiments, adding the identified media asset to the list of media assets comprises at least one of adding the identified media asset to a list or queue of media assets to be transmitted to the user, adding the identified media asset to a list of media assets recommended to the user, creating a bookmark to the identified media asset, creating a link to the identified media asset, and scheduling a recording of the identified media asset on a device associated with the user.

In some embodiments, a level of interest in the identified media asset of at least one of the user and the person with whom the user is interacting is determined based on the analysis of the verbal data. The identified media asset may be added to a list of media assets associated with the user in response to the level of interest in the identified media asset being above an upper predetermined threshold level. The identified media asset may not be added to a list of media assets associated with the user in response to the level of interest in the identified media asset being below a lower predetermined threshold level. In some embodiments, an aggregate level of interest in the identified media asset is calculated based on the levels of interest of at least two of the user and one or more people with whom the user has interacted.

In some embodiments, the number of times that the media asset, was identified within the data related to the interaction is monitored and compared to a predetermined threshold number. In response to the number of times the media asset was identified exceeding the predetermined threshold, the identified media asset is added to the list of media assets associated with the user.

In some embodiments, the number of interactions in which the media asset was identified is monitored and compared to a predetermined threshold number. In response to the number of interactions in which the media asset was identified exceeding the predetermined threshold, the identified media asset is added to the list of media assets associated with the user.

In some embodiments, the media asset is added to the list of media assets associated with the user based on the identity of the person with whom the user is interacting. In some embodiments, additional data identifying at least one interest of the person with whom the user is interacting is accessed. The at least one identified interest of the person with whom the user is interacting is compared to at least one interest of the user of the user device. Based on the results of this comparison, a level of interest similarity between the user and the person with whom the user is interacting is determined. The identified media asset is added to the list of media assets associated with the user based on the level of interest similarity.

In some embodiments, the text data is analyzed to identify a media asset interest level of the user of the user device. The identified media asset is added to the list of media assets associated with the user based on the media asset interest level of the user.

In some embodiments, a list of candidate media assets is determined based on information from a profile associated with at least one of the user and the person with whom the user is interacting. From the determined list of candidate media assets, a media asset that was referred to during the interaction by at least one of the user and the person with whom the user is interacting may be automatically identified.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 9 is an illustrative display screen showing selectable automated recommendation setup options providing actions to take when recommending a program in accordance with an embodiment of the invention;

FIG. 10 is an illustrative display screen showing a selectable automated recommendation setup option for providing a recommendation threshold in accordance with an embodiment of the invention;

FIG. 11 is an illustrative display screen showing a selectable automated recommendation setup option for providing preferred contacts for making recommendations in accordance with an embodiment of the invention;

FIG. 12 is an illustrative display screen showing a selectable automated recommendation setup option for providing contacts to ignore when making recommendations in accordance with an embodiment of the invention;

FIG. 13 is an illustrative display screen showing an automated recommendation in accordance with an embodiment of the invention;

FIG. 14 is an illustrative display screen showing a second automated recommendation in accordance with an embodiment of the invention;

DETAILED DESCRIPTION OF EMBODIMENTS

Figure 1:
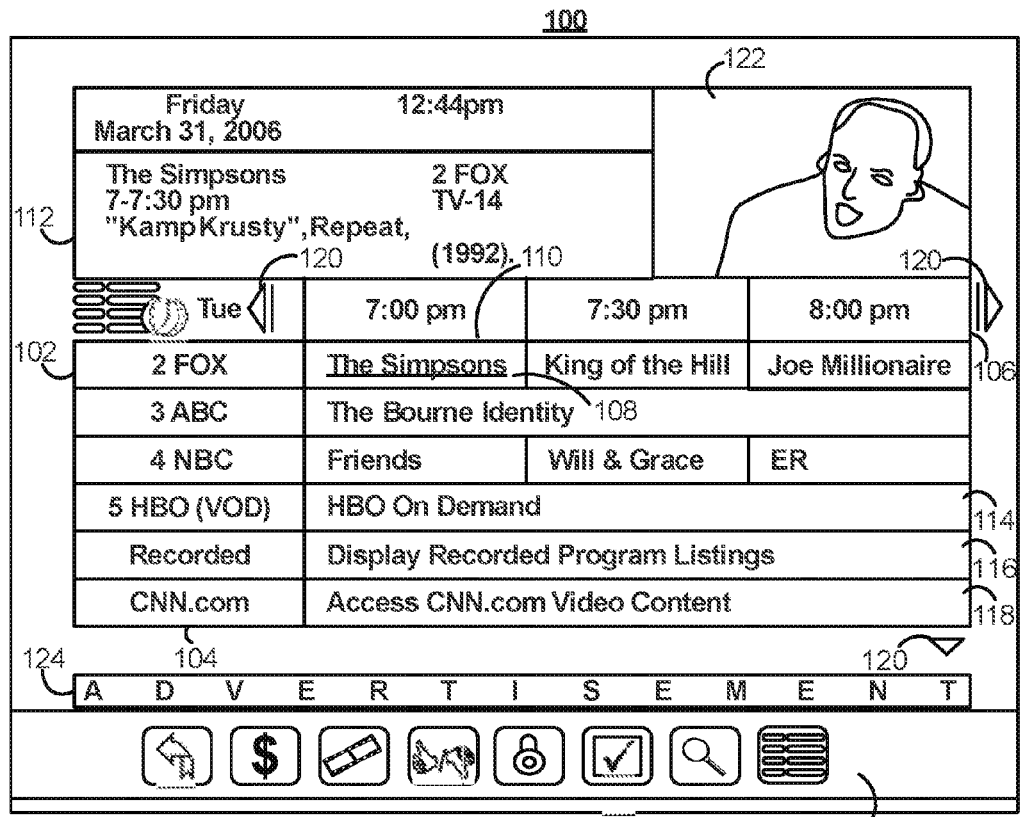
FIG. 1 shows an illustrative display screen that may be used to provide media guidance application listings and other media guidance information in accordance with an embodiment of the invention.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media availability, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, director names, episode names, and any other type of guidance data that is helpful for a user to navigate among and locate desired content selections. "Media guidance data" or "guidance data" may also include athletic teams or athletes, stadium names, names of hosts, names of commentators, place names, store names, restaurants, character names, occupations, artists, band names, album titles, song titles, and other words or phrases that could be used to identify content.

Figure 2:
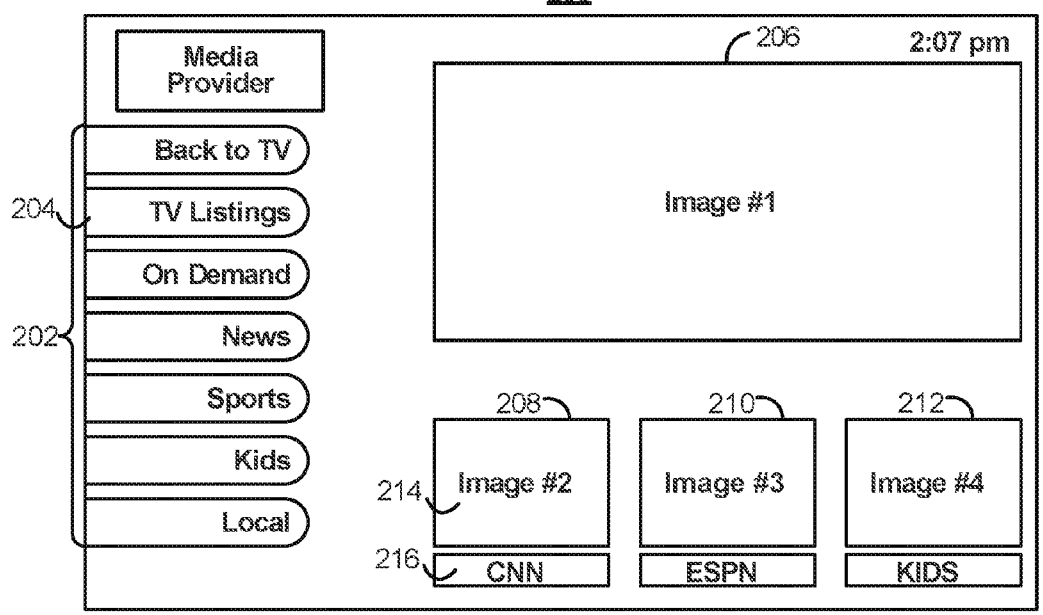
FIG. 2 shows another illustrative display screen that may be used to provide media guidance application listings in accordance with an embodiment of the invention.

FIGS. 1-2 show illustrative display screens that may be used to provide media guidance data. The display screens shown in FIGS. 1-2 and 9-14 may be implemented on any suitable user equipment device or platform. While the displays of FIGS. 1-2 and 9-14 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each Channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 103, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may Include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content: may include web events, such as a chat session or Webcast, or content available on-demand as streaming content or downloadable content through an Internet website or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different from display 100 may be based on user selection or guidance application definition (e.g., a display of only recorded and broadcast listings, only on-demand and broadcast listings, etc.), as illustrated, listings 114, 116, and 118 are shown as spanning the entire time block displayed in grid 102 co indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et. al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 23, 2002, which are hereby incorporated by reference herein in their entireties.

Another display arrangement for providing media guidance is shown in FIG. 2. Video mosaic display 200 includes selectable options 203 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
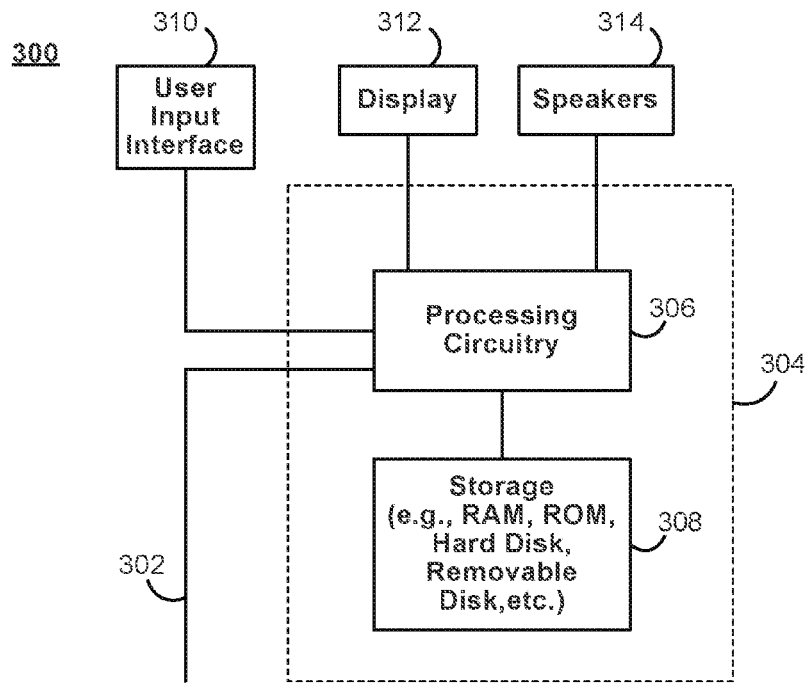
FIG. 3 is a block diagram of an illustrative user equipment device in accordance with an embodiment of the invention.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 300. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a microphone, remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files chat are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
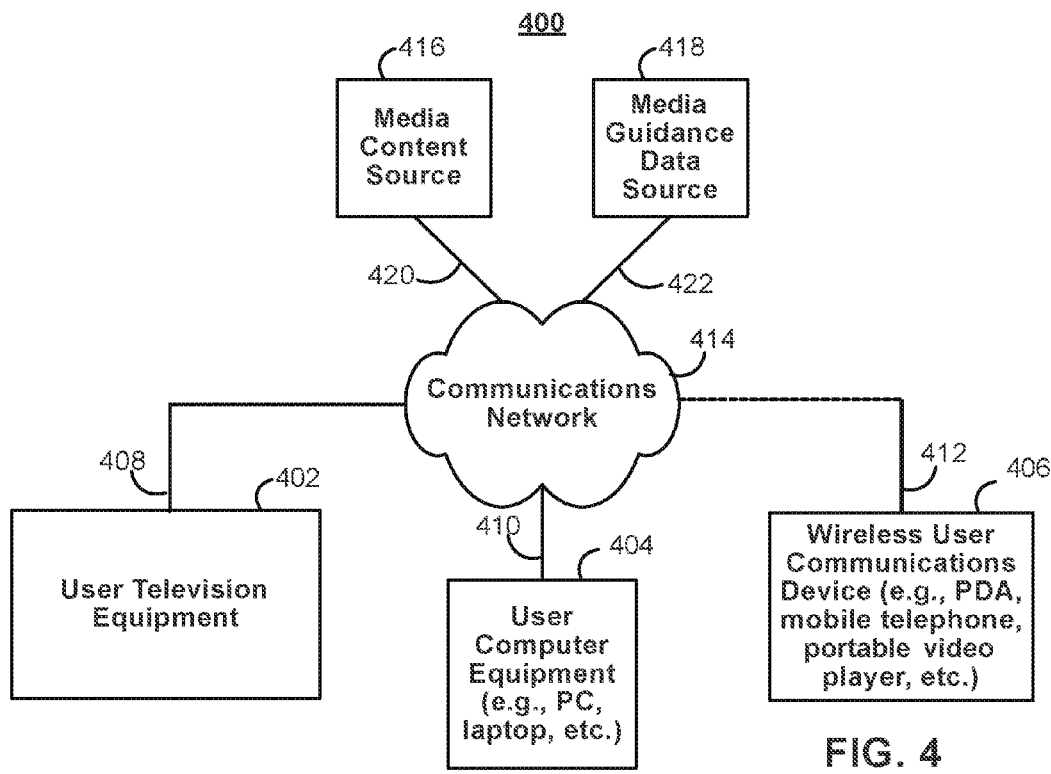
FIG. 4 is a block diagram of an illustrative interactive media system in accordance with an embodiment of the invention.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilises to make programming recommendations, display preferences, and other desirable guidance settings. For example, if a user sets a channel as a favorite on, for example, the website www.allrovi.com on his personal computer at his office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 416, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed).

Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client server applications where only a client application resides on the user equipment device, and a server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition, or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
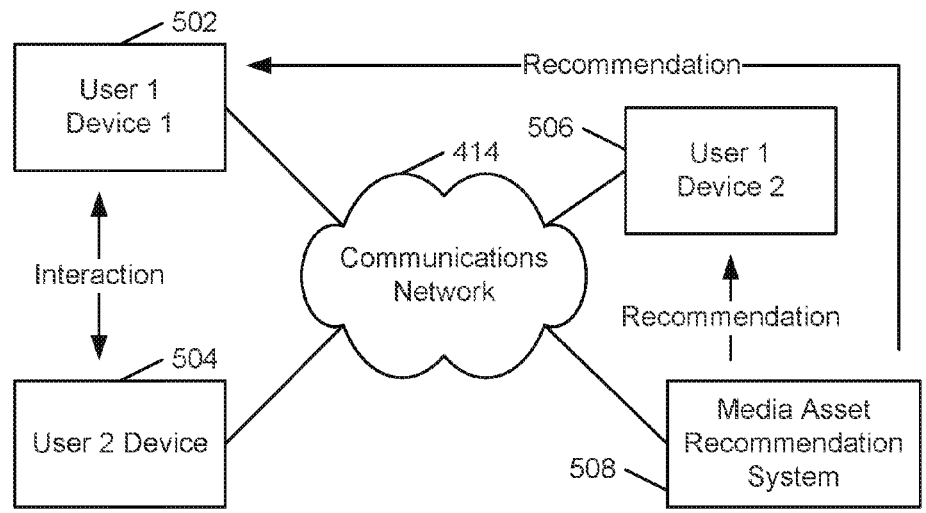
FIG. 5 is a block diagram of an illustrative system for recommending a media asset to a user based on an interaction between the user and another user over a communications network in accordance with an embodiment of the invention.

FIG. 5 is a block diagram of an illustrative system 500 for recommending a media asset to a user based on an interaction between the user and another user over a communications network. System 500 includes three user devices 502, 504, and 506 each connected to communications network 414 described above. Each of the user devices 502, 504, and 506 may be any of the user equipment devices 300 described above in relation to FIG. 3. For example, each of the user devices 502, 504, and 506 may be one of user equipment devices 402, 404, or 406 described above in relation to FIG. 4. User devices 502, 504, and 506 may be different types of user devices from each other. System 500 also includes a media asset recommendation system 508, which is connected to communications network 414 as well.

User device 502 is a first user device used by a first user. User device 504 is a first user device used by a second user. The first user and second user interact with each other over communications network 414 via their respective user devices 502 and 504. For example, the users may communicate using email, an instant messaging service (e.g., GOOGLE TALK, FACEBOOK chat, etc.), or a voice connection (e.g., a phone call or voice over IP). In some embodiments, user device 504 is connected to user device 502 through a different network from communications network 414 or through a non-networked connection.

The media asset recommendation system 508 receives data related to the interaction and, based on the interaction, identifies a media asset to recommend to the first user. For example, if the media asset recommendation system 508 determines from analyzing the interaction data that the second user mentioned the television program "Parks and Recreation" and the first user had not seen the program, media asset recommendation system 508 automatically generates a recommendation for "Parks and Recreation" to transmit to the first user. The recommendation may be in the form of a link to or bookmark of the media asset or to a webpage containing information about the media asset (e.g., the creation of a bookmark to the "Parks and Recreation" page on video streaming website HULU), an instruction to schedule a recording of the media asset, or placing the media asset in a queue associated with the user (e.g., placing the first season of "Parks and Recreation" in the user's NET-FLIX queue).

The media asset recommendation can be transmitted to the first user device used by the first user 502 or the second user device used by the first user 506. For example, if the first user's first user device 502 is a computer, tablet computer, cell phone, or smart phone, and the first user's second user device 506 is a television, media asset recommendation system 508 may transmit an instruction to schedule a recording to television 506. Additionally or alternatively, the media asset recommendation system 508 could update a web page that is accessible by the user with either first user device 502 or second user device 506. Thus, the recommendation could be transmitted to first user device 502, second user device 506, or both user devices when the user accesses the web page. The media asset recommendation system 508 is described in further detail in relation to FIG. 7.

Figure 6:
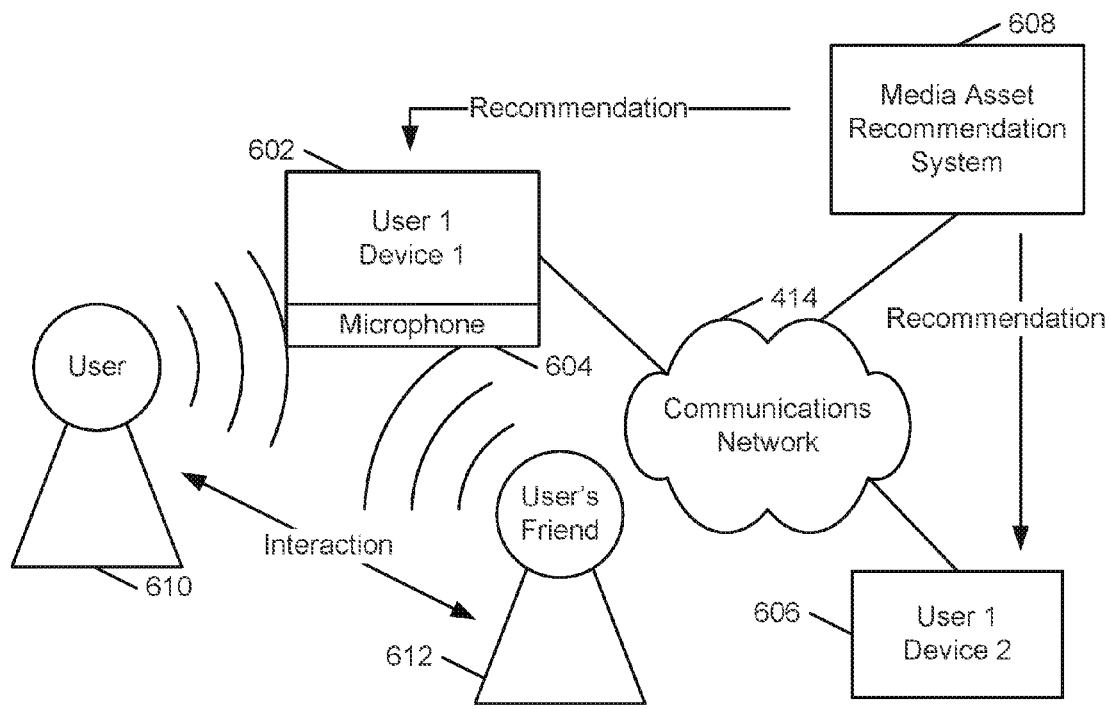
FIG. 6 is a block diagram of an illustrative system for recommending a media asset to a user based on a conversation between the user and another person recorded by a user device in accordance with an embodiment of the invention.

FIG. 6 is a block diagram of an illustrative system 600 for recommending a media asset to a user based on a conversation between the user and another person recorded by a user device. The system 600 includes two user devices 602 and 606 used by the first user; these may be similar to the user devices 502 and 506 described above. Both of the user devices 602 and 606 are connected to communications network 414 described above. The system 600 also includes a media asset recommendation system 608.

The first user device 602 includes a microphone 604 for detecting audio, and in particular, for detecting an interaction between the user 610 and another person 612 such as the user's friend or a family member. The interaction detected by microphone 604 is sent via communications network 414 to media asset recommendation system 608. Media asset recommendation system 608 is configured to convert the audio signal into text and then analyze the text of the interaction or analyze the audio of the interaction directly. After media asset recommendation system 608 has analyzed the interaction to generate a recommendation, it recommends media assets to the first user using the first user device 602 or the second user device 604 as described above. A more detailed system for recommending a media asset based on a detected conversation is described in relation to FIG. 8.

Figure 7:
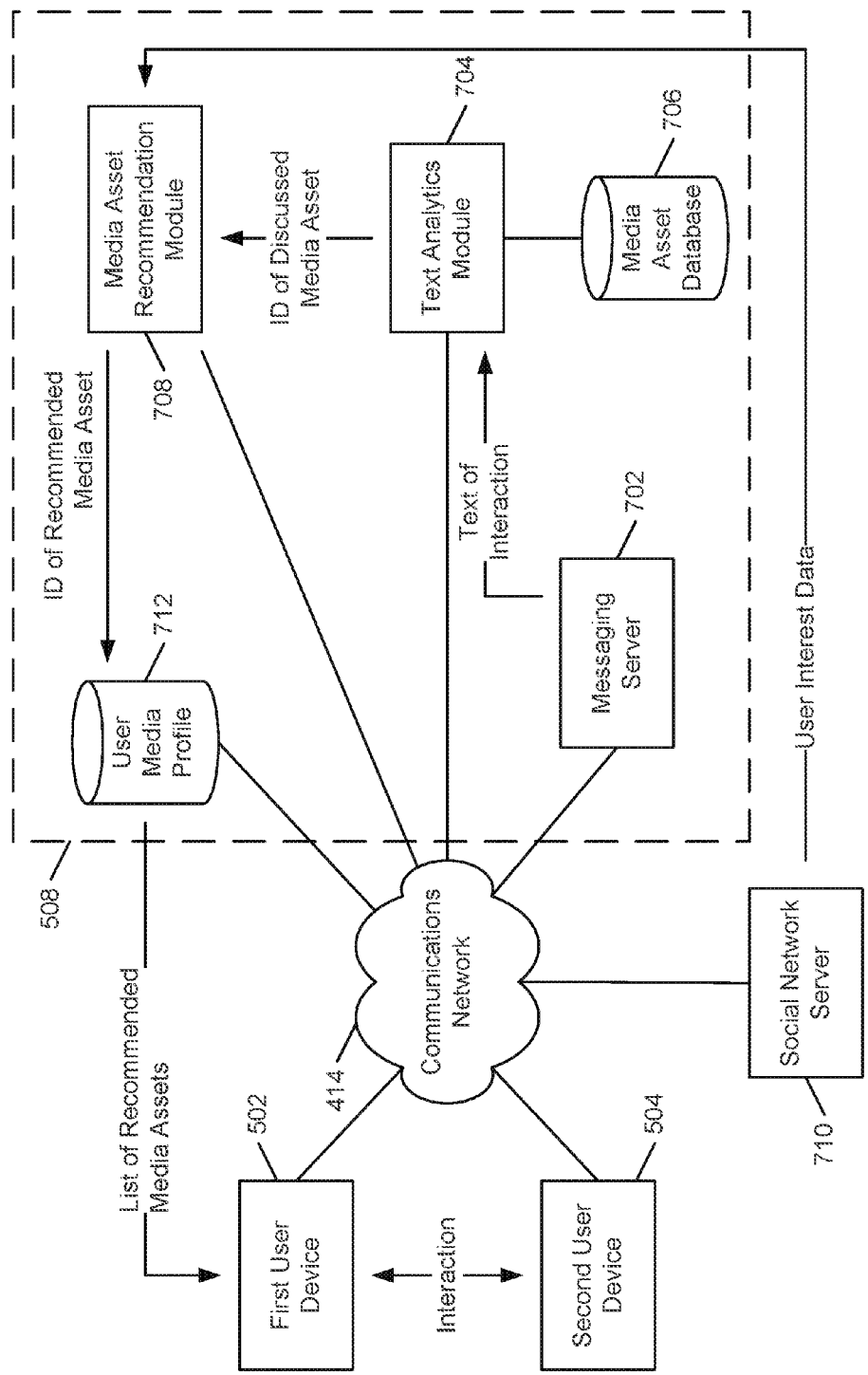
FIG. 7 is a block diagram of an illustrative system showing data flow for generating a media asset recommendation for a user based on an interaction between the user and another user over a communications network in accordance with an embodiment of the invention.

FIG. 7 is a block diagram of an illustrative system 700 showing details of the media asset recommendation system 508 from FIG. 5. FIG. 7 also shows data flow between various elements of the system 700 for generating a media asset recommendation for a user based on an interaction between the user and another user ever a communications network.

As in system 500 of FIG. 5, system 700 includes a first user device 502 that is interacting with a second user device 504 over communications network 414. System 700 further includes a social network server 710 connected to communications network 414. Media asset recommendation system 502 includes a messaging server 702, a text analytics module 704, a media asset database 706, a media asset recommendation module 708 and a user media profile 712.

Messaging server 702 supports messaging, emailing, or chatting over communications network 414. Messaging server 702 receives text sent by first user device 502 to second user device 504 and/or by second user device 504 to first user device 502. This text forms an interaction between a first user of first user device 502 and a second user of second user device 504. Messaging server 702 sends the text of the interaction to text analytics module 704. In some embodiments, messaging server 702 is not part of media asset recommendation system 508, but may be a third-party system from which media asset recommendation system 508 receives the text of the interaction, Alternatively, first user device 502 may send the text of the interaction to a media asset recommendation system 508 that does not include a messaging server 702, for example, the text of the interaction may be sent directly from first user device 502 to text analytics module 704.

Text analytics module 704 analyzes the received text of the interaction to identify content mentioned or discussed in the interaction. Text analytics module 704 is in communication with media asset database 706, which contains information related to content, such as any of the guidance data mentioned above and other words or phrases, or abbreviations or shorthand forms of words or phrases (e.g., abbreviations or shorthand forms of any of the guidance data mentioned above), that could be used to identify content. Text analytics module 704 uses the data in media asset database 706 to determine a media asset, if any, mentioned or discussed in the interaction. In some embodiments, text analytics module 704 uses a computerized predictive model to predict the probability that the interaction relates to content. The computerized predictive model may have been trained on a set of training data, i.e., interactions for which the discussed media assets are known.

In some embodiments, text analytics module 704 may use fuzzy matching techniques to determine the similarity between an interaction and possible content to which the interaction may relate. The fuzzy matching may compare words or phrases in the interaction to media guidance data stored in media asset database 706. In some embodiments, a fuzzy matching score is computed for each media asset in the media asset database, and the media asset with the highest score is selected. In order to identify a media asset, text analytics module 704 may require the fuzzy matching score for the media asset to exceed a predetermined threshold level. Fuzzy matching methods are described in further detail in Melnychenko, U.S. application Ser. No. 13/537,664, filed Jun. 29, 2012.

Text analytics module 704 may use natural language processing techniques to organize the text. Text analytics module 704 may filter stop words, such as articles and prepositions, from the text. In some embodiments, text analytics module 704 may only retain words of a certain part of speech, such as nouns and/or verbs. The remaining words may be reduced to their stem, based, or root form using any stemming algorithm. Additional processing of the text may include correcting spelling errors, identifying synonyms or related words, performing coreference resolution, and performing relationship extraction. Once the words have been processed, they may be counted and assigned word frequencies or ratios.

The computerized predictive model of text analytics module 704 mentioned above can be trained to classify an interaction as indicative of one or more media assets based on, for example, the word count or word frequency. Because of the large amount of data and large amount of potential media assets, Bayesian classifiers, such as Naïve Bayes classifiers and hierarchical Bayesian models, may be used. The text of the interaction can be viewed as a mixture of various topics, and learning the topics, their word probabilities, topics associated with each word, and topic mixtures of interactions is a problem of Bayesian inference. Suitable statistical classification methods include random forests, random naïve Bayes. Averaged One-Dependence Estimators (AODE), Monte Carlo methods, concept mining methods, latent semantic indexing, k-nearest neighbor algorithms, or any other suitable multiclass classifier. The selection of the classifier can depend on the size of the training data set, the desired amount of computation, and the desired level of accuracy. When additional media assets are added to media asset database 706, the computerized predictive model may be updated and/or subject to additional training.

If text analytics module 704 identifies a media asset in an interaction, text analytics module 704 sends an identifier for the discussed media asset to media asset recommendation module 708. Media asset recommendation module 708 determines whether to recommend the media asset to the user. Media asset recommendation module 708 may consider, for example, the number of times the media asset was identified, the number of people who discussed or mentioned the media asset, the user's interest in the media asset, the identity of the contact, the contact's attitude toward the media asset, or any other additional factor or combination of factors when determining whether to recommend the media asset to the user.

For example, media asset recommendation module 708 may count the number of times a particular media asset was mentioned in an interaction and determine whether to recommend the media asset based on whether its number of mentions has passed a given threshold. Further, media asset recommendation module 708 may count the number of interactions in which a particular media asset was identified and determine whether to recommend the media asset based on whether its number of identifications has passed a given threshold. Media asset recommendation module 708 may additionally or alternatively count the number of contacts who mentioned a particular media asset and determine whether to recommend the media asset based on whether the number of contacts has passed a given threshold.

In some embodiments, interactions with certain contacts are weighted more heavily than interactions with others. For example, users can choose to weight heavily media assets mentioned or recommended by close contacts or contacts they know have similar taste in music, movies, television programs, etc. to them. Similarly, users can weight lightly or ignore media assets mentioned by or recommended by more distant contacts or contacts they know have different tastes from them. In some embodiments, media asset recommendation module 708 can monitor the user's response to the recommendations and, based on the response, determine contacts whose recommendations the user is more responsive to and contacts whose recommendations the user is less interested in.

In addition to identifying a media asset, text analytics module 704 may also analyze the text to determine the user's interest or attitude towards the identified media asset and/or the contact's interest or attitude towards the identified media asset. When analyzing interests or attitudes, analytics module 704 may focus on the text near the text relating to the identified media asset. Text analytics module 704 may use this data to determine whether to send the media asset identifier to media asset recommendation module 708, or text analytics module 704 may send data describing the user's and/or contact's attitude to media asset recommendation module 708.

In the latter case, media asset recommendation module 708 can determine whether to recommend a media asset based on the user's and/or contact's attitude or level of interest. Media asset recommendation module 708 may assign a level of interest and compare it to an upper threshold above which the media asset is recommended or a lower threshold below which the media asset will not be recommended. For example, if the text from the user in the interaction indicates that the user is highly interested in the media asset (e.g., "The Bachelorette sounds amazing! I'll definitely check it out this weekend."), media asset recommendation module 708 may decide to recommend the media asset to the user. Alternatively, if the text from the user indicates that the user has a negative attitude about the media asset (e.g., "The Bachelorette sounds terrible! I can't believe you watch that garbage."), media asset recommendation module 708 may decide not to recommend the media asset to the user.

In some embodiments, media asset recommendation module 708 may allow a user's statements to outweigh or override a contact's recommendation. For example, if the contact speaks highly of the media asset (e.g., the contact says "I can't come to your birthday party—The Bachelorette is on then, and I simply cannot miss it."), and the user responds negatively (e.g., "That is a lousy excuse!. The Bachelorette sounds terrible."), media asset recommendation module 708 may refrain from recommending the media asset. In other embodiments, media asset recommendation module 708 may weigh the user's statements and the user's contact's statements equally, or media asset recommendation module 708 may put greater weight on the user's contact's statements. In some embodiments, media asset recommendation module 708 may determine an aggregate level of interest in a media asset that is based on the levels of interest of the user and/or one or more contacts towards the media asset. Media asset recommendation module 708 may then determine whether to recommend the media asset based on the aggregate level of interest. For example, media asset recommendation module 708 may compare the aggregate level of interest to one or more thresholds to determine whether to recommend the media asset, not recommend the media asset, or await further information before deciding whether to recommend the media asset.

In some embodiments, media asset recommendation module 708 determines whether to recommend a media asset based on a level of interest similarity between the user and a contact who mentioned the media asset. Media asset recommendation module 708 may access data from a social network server 710 that stores information related to interests of the user and the contact. Methods for identifying interests of a user of a social network based on data stored on a social network server is described in detail in Alcala, U.S. patent application Ser. No. 13/453,506, filed Apr. 23, 2012.

Media asset recommendation module 708 compares the interests of the user to the interests of the contact to determine a level of similarity or correlation since users with more similar interests may be more likely to enjoy similar media content. In some embodiments, media asset recommendation module 708 may only consider interests in media or certain types of media. Alternatively, media asset recommendation module 708 may weight more heavily the level of similarity of interest of media assets than the level of similarity of other types of interests. Alternatively, media asset recommendation module 708 may weight more heavily the level of similarity of interest in certain types of media assets. In some embodiments, social network server 710 may be part of media asset recommendation system 502. In other embodiments, media asset recommendation module 708 may receive Interest data from another type of source or multiple sources.

In some embodiments, media asset recommendation module 708 may identify one or more candidate media assets that are likely to be mentioned in an interaction or that the user may likely be interested in. For example, media asset recommendation module 708 may determine one or more candidate media assets based on interests in the user's and/or contact's social network profile or information within a user profile, such as identifiers of previously accessed media assets or demographic information.

In particular, media asset recommendation module 708 may identify, as candidate media assets, media assets that the user and/or the contact has indicated an interest in or has watched previously. Additionally or alternatively, media asset recommendation module 708 may identify candidate media assets that are similar to the media assets in which the user and/or contact has indicated an interest or has watched previously (e.g., the candidate media asset has a common actor, director, or genre to a previously viewed media asset). Additionally or alternatively, media asset recommendation module 708 may identify candidate media assets that are popular among the demographic of the user and/or the contact. Media asset recommendation module 708 may sort or rank the identified media assets based on, for example, how recently they have been accessed or how recently they have been made available.

In some embodiments, a list, of candidate media assets is determined by a different module and accessed by media asset recommendation module 708. Once the candidate media assets have been determined by the other module or by media asset recommendation module 708, text analytics module 704 may access the list of candidate media assets. Text analytics module 704 may then access information related to the candidate media assets from media asset database 706 and determine a media asset mentioned or discussed in an interaction using only the information related to the candidate media assets based on any of the techniques described above. In some embodiments, text analytics module 704 uses the list of candidate media assets instead of media asset database 706 for determining a media asset mentioned or discussed in the interaction. In other embodiments, text analytics module 704 may first use the list of candidate media assets for determining a media asset mentioned or discussed in the interaction, and, if none of the candidate media assets were identified, text analytics module 704 may then use the full media asset database 706 for determining a media asset mentioned or discussed in the interaction. Either of these approaches may reduce processing power by reducing the amount of information that the text of the interaction is compared to.

Once media asset recommendation module 708 has decided to recommend the media asset to the user, it sends an identifier of the media asset to user media profile 712. User media profile 712 may be associated with, for example, a television subscription, a DVR, an Internet television service, an over-the-top subscription service, a website, a streaming media service, a DVD-by-mail service, or any other means through which a user can access media and/or media recommendations. Sending the identifier of the media asset to user media profile 712 may result in, for example, the identified media asset being added to a list or queue of media assets to be transmitted to the user, the identified media asset being added to a list of media assets recommended to the user, a bookmark to the identified media asset being created, a link to the identified media asset being created, and a recording of the identified media asset being scheduled on a device associated with the user. The user may be able to access his user media profile 712 and/or a list of recommendations associated with the user media profile 712 using the first user device 502 or another user device, such as the first user's second user device 506 of FIG. 5. The user may access user media profile 712 over communications network 414. In some embodiments, user media profile 712 is not part of media asset recommendation system 508 as shown. In such embodiments, user media profile 712 may be stored on social network server 710 or on a separate server.

Figure 8:
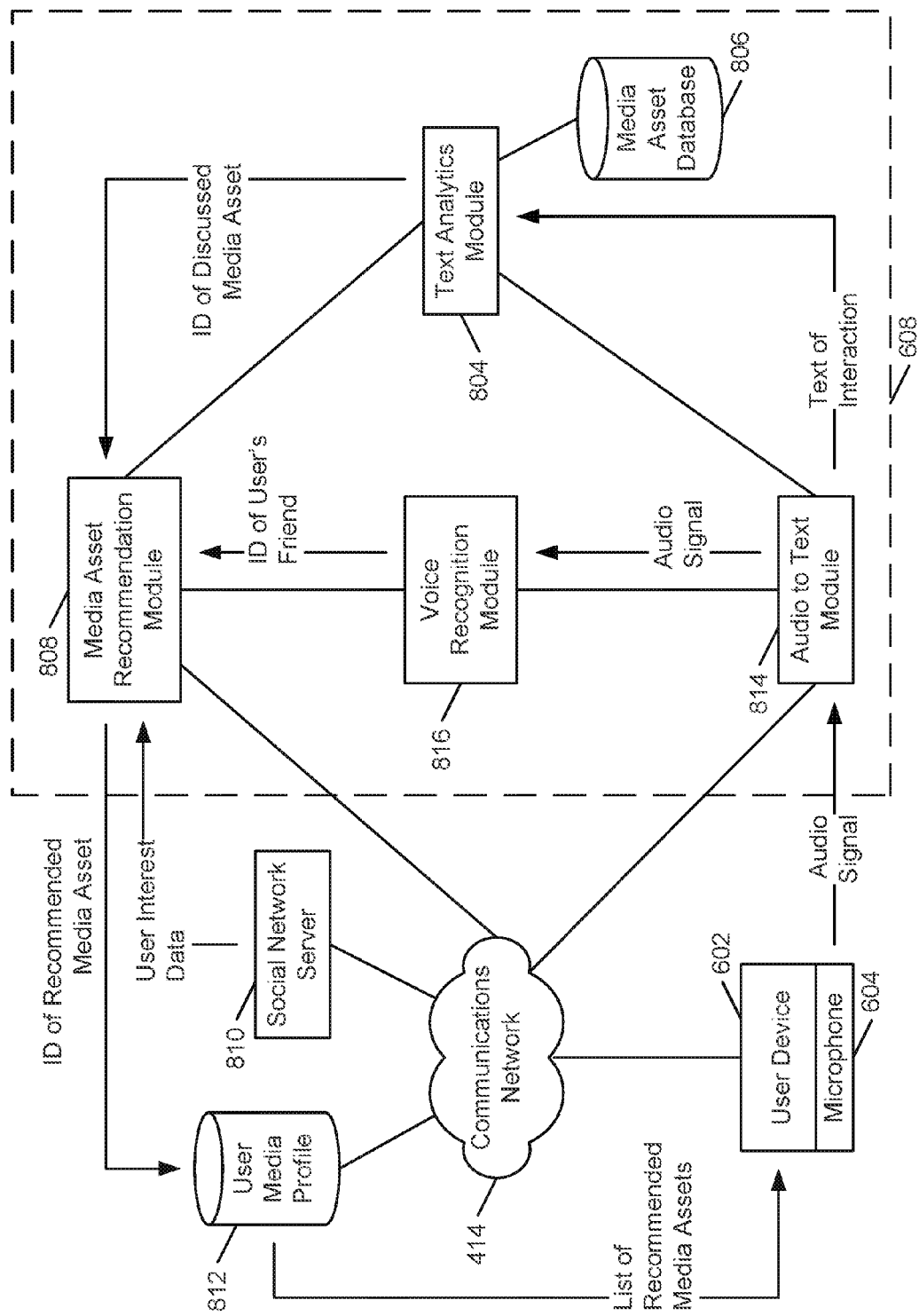
FIG. 8 is a block diagram of an illustrative system showing data flow for generating a media asset recommendation for a user based on a conversation between the user and another person recorded by a user device in accordance with an embodiment of the invention.

FIG. 8 is a block diagram of an illustrative system 700 showing details of the media asset recommendation system 608 from FIG. 6. FIG. 8 also shows data flow between various elements of the system 800 for generating a media asset recommendation for a user based on an conversation between the user and another person recorded by a user device, as shown in FIG. 6.

As in system 600 of FIG. 6, system 800 includes a user device 602 having a microphone 604 and connected to communications network 414. Microphone 604 records a conversation between the user and another person (not shown). Microphone 604 can begin recording the conversation when a given sound threshold is detected, when the user's voice is identified, when the user indicates that the conversation should be recorded, or according to other conditions. Alternatively, microphone 604 can be configured to continuously record its environment. System 800 further includes a social network server 810 connected to communications network 414; social network server 810 is similar to social network server 710 described above. Media asset recommendation system 608 includes an audio to text module 814, a voice recognition module 816, a text analytics module 706, a media asset database 806, a media asset recommendation module 808, and a user media profile 812.

Audio to text module 814 receives an audio signal from the microphone 604. Audio to text module 814 may receive the audio signal over communications network 414, or in other embodiments, audio to text module 814 may be part of user device 602. Audio to text module 814 processes the received audio signal to convert it to text using any known speech recognition process. Audio to text module 814 sends the text of the interaction to text analytics module 804.

Text analytics module 804 is similar to text analytics module 704, described above. Text analytics module 804 receives data from media asset database 806, which is similar to media asset database 706, described above. Text analytics module 804 determines a media asset discussed in the conversation based on the text of the conversation received from audio to text module 814. Text analytics module 804 communicates an identifier of the identified media asset to media asset recommendation module 808. In some embodiments, rather than using text analytics module 804 to analyze the interaction, an audio analytics model analyzes the audio signal directly to identify discussed media assets without converting the audio signal to text. In such embodiments, there may be no text to audio module 814.

In some embodiments, the audio signal of the interaction is analyzed to determine a tone of the user, the contact, or the interaction relating to the media asset to gauge the user's and/or contact's interest in the media asset.

Media asset recommendation module 808 is similar to media asset recommendation module 708 described above and may use similar factors in determining whether to recommend a particular media asset to the user. Media asset recommendation system 808 may receive social network data indicative of user interests from social network server 810, which is similar to social network server 710, described above. A recommendation generated by media asset recommendation module 808 is communicated to user media profile 812, which is similar to user media profile 712, except as shown in FIG. 8, user media profile is outside of media asset recommendation system 608. In other embodiments, user media profile 712 may be stored on social network server 810 or in media asset recommendation system 608. The form of the recommendation can be similar to the recommendations described above.

Audio to text module 814 may transmit the audio signal to voice recognition module 816 to perform voice recognition. In other embodiments, voice recognition module 816 may receive the audio signal from user device 602 via communications network 414, or voice recognition module 816 may be part of user device 602. Voice recognition module 816 identifies the user's voice and determines who the other person or people with whom the user is speaking, voice recognition module 816 may be trained based on previous recorded interactions in which the contact was identified by the user, or may be trained on spoken conversations over communications network 414 in which the other speaker, using another user device, can be identified. For example, voice recognition module may be trained to identify a user's contacts based on their voices using recorded calls between cellular phones or voice over IP (VoIP) calls.

If the interaction occurs over communications network 414, rather than between two people in the same location, the one or more other speakers can be identified based on IP address, telephone number, contact information stored on user device 602, or other identifying information, rather than voice recognition module 816.

A user can arrange to receive automated recommendations by, for example, downloading an application or software module onto a user device 300 (e.g., user device 502 or 602) that allow interactions taking place using the user device 300 or near the user device 300 to be monitored. The application or software module may include a setup process for receiving instructions from the user indicating how the user would like to receive recommendations and how to determine when to supply a recommendation. Exemplary setup options are shown in FIGS. 9 through 12.

FIG. 9 is an illustrative display screen 900 of a user device 300 showing selectable automated recommendation setup options providing actions to take when recommending a program. The display screen 900 asks the user what type of action should be taken when the user is engaged in a conversation that discusses a media asset that the user may be interested in consuming. The user device 300 may allow the user to select from a list of options 902 including Set a Reminder, Record the Program, Add it to my Queue, Bookmark the Program, Send me a Link, and Add it to a List of Recommendation. As shown in FIG. 9, the user has selected the "Add it to my Queue" option. Some of the recommendation options may request additional information, e.g., where to send a link, how to configure the reminder, where in the queue to place the media asset, etc., in subsequent display screens or overlays. In some embodiments, the user may select multiple actions to take when recommending a program. After the user has selected the desired actions, he selects the "Next" button 904, which presents another set up option or finalizes the settings.

FIG. 10 is an illustrative display screen 1000 of user device 300 showing a selectable automated recommendation setup option for providing a recommendation threshold. User device 300 may present display screen 1000 after receiving a selection of the "Next" button in display screen 900. The display screen 900 asks the user for a recommendation threshold, i.e., the number of times the media asset recommendation system 508 or 608 should identify a media asset in a user's interactions before recommending it.

The recommendation threshold may be defined as the number of times that the media asset was identified within one or more interactions. For example, over two interactions, the media asset recommendation system 508 or 608 may detect the phrase "Parks and Recreation" or "Parks and Rec" (a common shorthand name for the show "Parks and Recreation") used eight times; thus, the media asset recommendation system 508 or 608 identified the media asset eight times, and this can be compared to the threshold input by the user. Media asset recommendation system 508 or 608 may check for a set distance between mentions in order to consider the mentions part of two different detections. The distance may be, for example, a number of lines of text, a number of words, or a length of time.

Alternatively, in other embodiments, the number of interactions in which the media asset was identified is monitored. For example, the media asset recommendation system 508 or 608 may identify three different interactions (e.g., interactions with different people, or distinct interactions including one or more of the same person) in which the upcoming football game between the NEW YORK JETS and the NEW ENGLAND PATRIOTS is mentioned. The media asset recommendation system 508 or 608 may determine that an interaction discusses the JETS v. PATRIOTS game based on, for example, detection of some combination of "New York", "New England", "Jets", "Patriots", "Pats" (a common abbreviation for "Patriots"), Sanchez (a player for the NEW YORK JETS), Brady (a player for the NEW ENGLAND PATRIOTS), etc.

The display screen 1000 can be customized based on a user's previous response to setup options. For example, since the user had previously indicated in FIG. 9 that he wants a recommended program to be added to his queue, the user device 300 asks "In general, how many times should you discuss the program before I add it to your queue?"

FIG. 11 is an illustrative display screen 1100 showing a selectable automated recommendation setup option for providing preferred contacts for making recommendations. As discussed above in relation to FIG. 7, a user may choose to weight heavily the mention of media assets by certain contacts, such as close contacts or contacts they know have similar taste in music, movies, television programs, etc. to them. To obtain this information, user device 300 displays screen 1100 asking the user if there are any contacts it should favor when making recommendations. Favored contacts 1102 are displayed and can be removed from the favored contacts list by selecting the "X" next to their names. User device 300 can receive additional contacts via the user's selection of a contact in drop down menu 1104. The contacts available in drop down menu 1104 can be populated by, for example, social network contacts, mobile device contacts, email contacts, or messaging contacts. When user device 300 receives a selection of a contact in drop down menu 1104, it can display that contact in the list of favored contacts 1102 and allow the user to select a new contact using drop down menu 1104. Once the user has finished selecting favored contacts, he selects the "Next" button 1106.

Upon receiving a selection of "Next" button 1106, user device 300 may present display screen 1200 of FIG. 12. Display screen 1200 includes a selectable automated recommendation setup option for providing contacts to ignore when making recommendations. As discussed above in relation to FIG. 7, users can weight lightly or ignore certain contacts, such as more distant contacts or contacts they know have different tastes from them. To obtain this information, user device 300 asks the user whether there are any contacts it should ignore when making recommendations. Ignored contacts 1202 are displayed and can be removed from the ignored contacts list by selecting the "X" next to their names. User device 300 can receive additional contacts via the user's selection of a contact in drop down menu 1204. The contacts available in drop down menu 1204 can be populated by, for example, social network contacts, mobile device contacts, email contacts, or messaging contacts. When user device 300 receives a selection of a contact in drop down menu 1204, it can display that contact in the list of ignored contacts 1202 and allow the user to select a new contact using drop down menu 1204. Once the user has finished selecting favored contacts, he selects the "Next" button 1206 to complete automated recommendations setup.

FIG. 13 is an illustrative display screen showing an automated recommendation generated by media asset recommendation system 508 or 608. As shown, media asset recommendation system 508 or 608 has identified from the user's interaction that the user may be interested in watching the live football game between the NSW YORK JETS and the NEW ENGLAND PATRIOTS scheduled for Sunday, October 21 at 4:25 pm. For example, microphone 604 of user device 602 may have recorded the user and a friend placing bets on the JETS v. PATRIOTS game (e.g., the friend says "I bet you $50 that Sanchez will throw for more yards than Brady this Sunday" followed by the user saying "You're on!"). Media asset recommendation system 608 will identify that the user is interested in the JETS v. PATRIOTS game, and user device 608, upon receiving identifying information for this media asset from media asset recommendation system 608, or upon accessing the recommendation from user media profile 812, asks the user whether it should take any of the options 1302 available for a live-broadcast program: set a reminder, record the program, bookmark the program, and/or send the user a link to the program. Additional or alternative options available for live content may be included in options 1302. The user can select one or more of these options and, after he has completed his selection(s), select the "Done" button 1304. User device 608 then processes the selection(s) and takes actions as required to implement the user's selected action(s). Alternatively, if the user is not Interested in watching the JETS v. PATRIOTS game or does not want any of the actions 1302 to be taken, the user may select the "No, thanks" button 1306. In that case, user device 608 would not take any of the actions 1302.

FIG. 14 is an illustrative display screen showing a second automated recommendation generated by media asset recommendation system 508 or 608. As shown, media asset recommendation system 508 or 608 has identified from the user's interaction that the user may be interested in watching BUFFY the vampire slayer, a television program which is no longer regularly broadcast, but is available in non-broadcast forms, such as through over-the-top content providers, on-demand providers, Internet providers, or streaming media providers. For example, a user of user device 502 may have a conversation with a friend using user device 504 over an instant messaging service, such as GOOGLE TALK. The following conversation is analyzed by the media asset recommendation system:

Friend: Season 6 of Buffy is getting really exciting

User: I don't think that I made it that far—I stopped watching after season 5

Friend: You missed out on the best part of the series!

User: I should really go back and watch it one of these days.

Based on this interaction, media asset recommendation system 508 will identify that the user is interested in watching season 6 of BUFFY THE VAMPIRE SLAYER and add this as a recommendation. Upon receiving information identifying BUFFY THE VAMPIRE SLAYER Season 6 from media asset recommendation system 508, or upon accessing user media profile 712, user device 502 or 506 asks the user whether it should take any of the options 1402 available for an on-demand program: add the first season of the program to the user's queue, bookmark the program, or send the user a link to the program. Additional or alternative options available for on-demand content may be included in options 1402. The user can select one or more of these options and, after he has completed his selection(s), select the "Done" button 1404. User device 300 then processes the selection(s) and takes actions as required to implement the user's selected action(s). Alternatively, if the user is not interested in watching BUFFY THE VAMPIRE SLAYER or does not want any of the actions 1402 to be taken, the user may select the "No, thanks" button 1406. In that case, user device 502 or 506 would not take any of the actions 1402.

Figure 15:
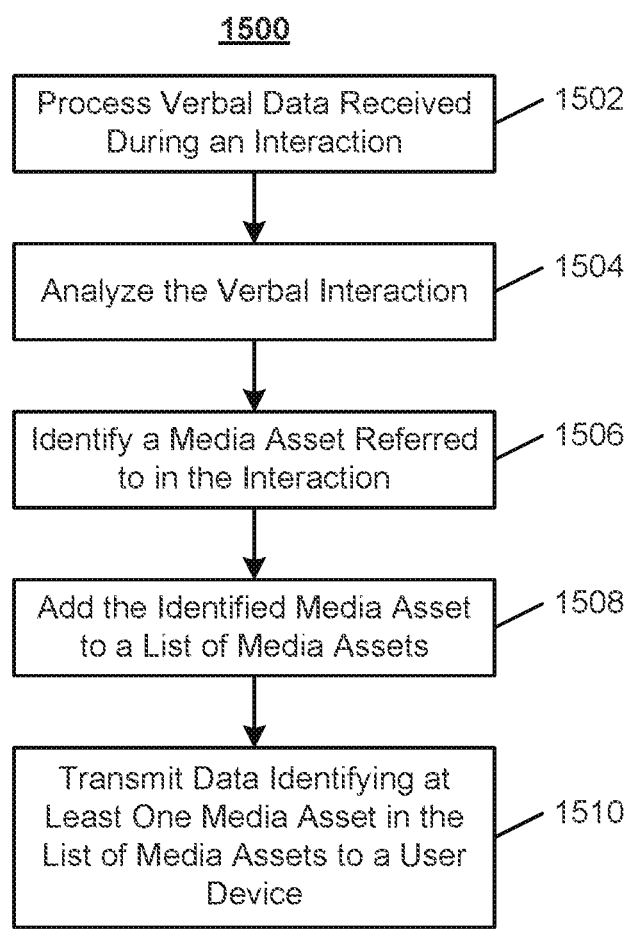
FIG. 15 shows an illustrative process for automatically generating a media asset recommendation based on a user's interaction in accordance with an embodiment of the invention.

FIG. 15 shows an illustrative process for automatically generating a media asset recommendation based on a user's interaction. First, media asset recommendation system 508 or 605 processes verbal data received during an interaction, e.g., the audio signal recorded during a user's interaction, as described in relation to FIGS. 6 and 8 (step 1502). Media asset recommendation system 608, upon receiving the audio of a user's interaction, may convert the audio to text, as described in relation to FIG. 8. Media asset recommendation system 508 or 608 analyzes the verbal interaction (step 1504). Based on the analysis, media asset recommendation system 508 or 608 identifies a media asset that was referred to during the interaction (step 1506). The identified media asset is added to a list of media assets associated with the user, such as list of recommendations in user media profile 712 or 812 (step 1508). Media asset recommendation system 508 or 608 or user media profile 712 or 812 then transmits data identifying at least one media asset in the list of recommended media assets to a user device associated with the user (step 1510).

Figure 16:
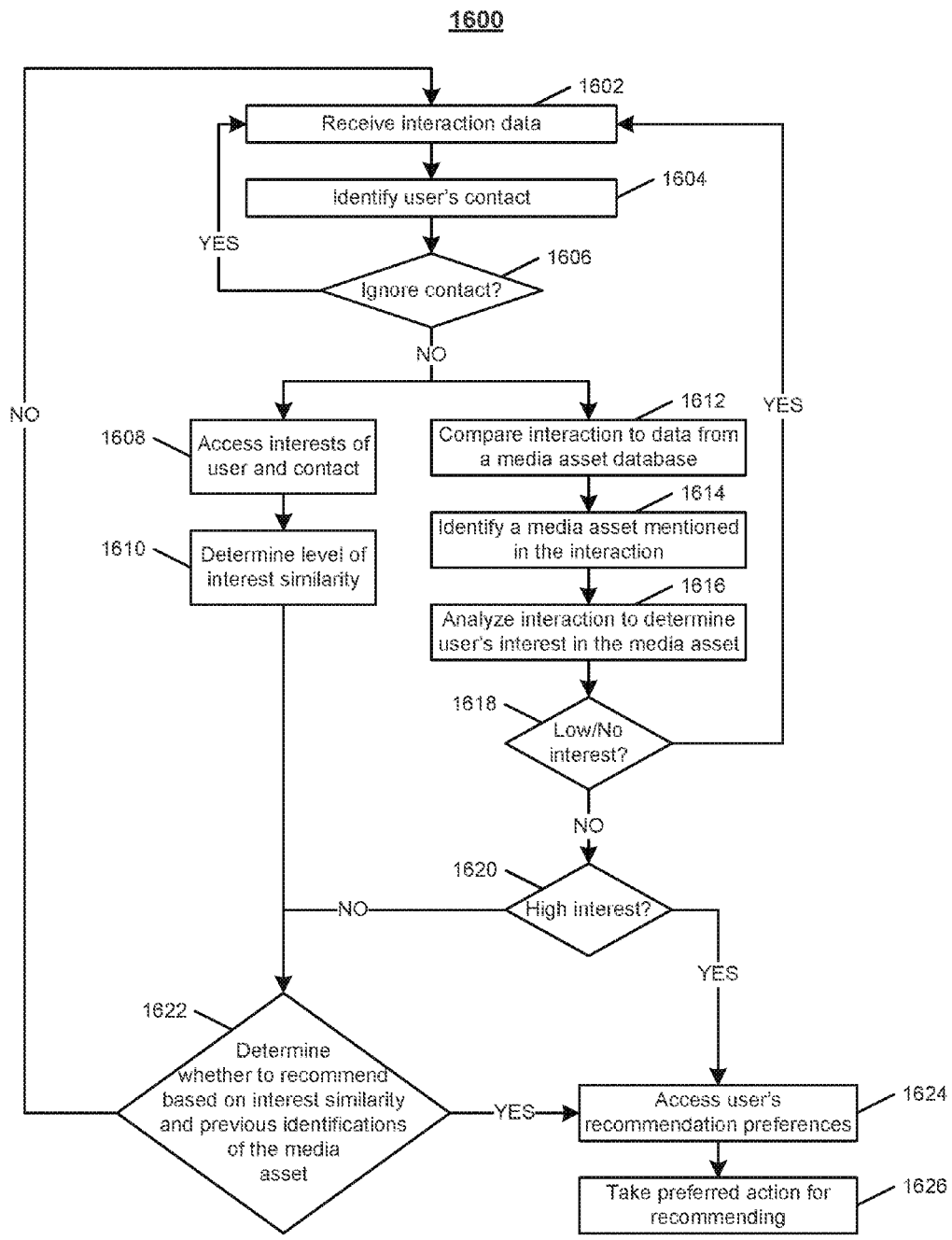
FIG. 16 shows an illustrative process for automatically generating a media asset recommendation based on a user's interaction and various user input and interest data in accordance with an embodiment of the invention.

FIG. 16 shows an illustrative process for automatically generating a media asset recommendations based on a user's interaction and various user input and interest. First, media asset recommendation system 508 or 608 receives the text of a user's interaction, as described in relation to FIGS. 5 and 7, or the audio of a user's interaction, as described in relation to FIGS. 6 and 8 (step 1602). Based on the received data, media asset recommendation system 508 or 608 identifies one or more of the user's contacts involved as described in relation to FIG. 7 or 8 (step 1604). Based on the identity of the contact, media asset recommendation system 508 or 608 determines whether the media assets mentioned by the contact should be ignored, as described, for example, in relation to FIG. 12 (decision 1606). If the contact is to be ignored, media asset recommendation system 508 or 608 continues monitoring a user's interactions or receiving data from monitored conversations.

If the contact is not to be ignored, media asset recommendation system 508 or 608 accesses the interests of the user and the contact, for example from social network server 710 or 810 (step 1608) and determines a level of interest similarity based on the identified interests (step 1610), as described in relation to FIG. 7. Media asset recommendation system 508 or 608 also compares the data from the interaction (text or audio) to data from a media asset database, e.g., by using a computerized predictive model trained with data from the media asset database, as described in relation to FIG. 7 (step 1612). Based on this comparison, media asset recommendation system 508 or 608 identifies a media asset that was mentioned in the interaction (step 1614). Media asset recommendation system 508 or 608 analyzes the text or audio of the interaction to determine the user's interest in the media asset (step 1616).

Based on the analysis of the user's interest in the media asset, media asset recommendation system 508 or 608 determines whether the user has low or no interest (decision 1618). If the user has little interest in the media asset, media asset recommendation system 508 or 608 continues monitoring a user's interactions or receiving data from monitored conversations. If the user does not have low or no interest in the media asset, media asset recommendation system 508 or 605 determines whether the user has a high interest in the media asset (decision 1620). If the user has a high interest in the media asset, media asset recommendation system 508 or 608 may immediately recommend the media asset. To do this, media asset recommendation system 508 or 608 accesses the user's recommendation preferences received as described in FIG. 9 (step 1624). Based on the user's recommendation preferences, media asset recommendation, system 508 or 608 takes the desired action for recommending the media asset (step 1626).

If the user does not have a high interest in the program (e.g., the user has a moderate interest in the program, or the level of interest was not determined), media asset recommendation system 508 or 608 determines whether to recommend the program based on the interest similarity determined in step 1610 and the previous identifications of the media asset (decision 1622). For example, media asset recommendation system 508 or 608 may compare the number of times the media asset was identified to a threshold received from the user as described in relation to FIG. 10. If the asset recommendation system 508 or 608 determines to recommend in step 1622, media asset recommendation system 508 or 608 accesses the user preferences and takes the desired action for recommending the media asset based on the user's recommendation preferences (steps 1624 and 1626). Otherwise, media asset recommendation system 508 or 608 continues monitoring a user's interactions or receiving data from monitored conversations.

It should be understood that the above steps of the flow diagrams of FIGS. 15 and 16 may be executed or performed in any order or sequence not limited to the order and sequence shown and described in the figures. Also, some of the above steps of the flow diagrams of FIGS. 15 and 16 may be executed or performed substantially simultaneously where appropriate or in parallel to reduce latency and processing times.

The above-described embodiments of the present disclosure are presented for purposes of illustration and not of limitation, and the present disclosure is limited only by the claims which follow.

What is claimed is:

1. A method for automatically performing an action on a recommended media asset, the method comprising:
   receiving, using control circuitry, data representing an interaction between a user and a person with whom the user is interacting;
   processing the received data to extract media asset identifiers;
   comparing the extracted media asset identifiers with a plurality of media assets in a media asset database;
   identifying a media asset, referenced in the extracted media asset identifiers, from the plurality of media assets based on the comparing;
   retrieving, from user preferences of the user, an action previously identified by the user; and
   automatically performing the action on the media asset.

2. The method of claim 1, further comprising:
   determining a level of interest in the media asset of at least one of the user and the person with whom the user is interacting based on the received data;
   comparing the level of interest to a threshold level;
   determining whether the level of interest is above the threshold level based on comparing the level of interest to the threshold level; and
   automatically performing the action in response to determining that the level of interest is above the threshold level.

3. The method of claim 2, further comprising determining the level of interest based on a characterization of the media asset in the received data by at least one of the user and the person with whom the user is interacting.

4. The method of claim 1, further comprising:
retrieving, from a database of friends of the user, a recommendation weight corresponding to the person with whom the user is interacting;
comparing the recommendation weight to a threshold weight;
determining whether the recommendation weight is above the threshold weight; and
determining whether to perform the action on the media asset in response to determining that the recommendation weight is above the threshold weight.

5. The method of claim 1, further comprising:
receiving a user selection of the action indicating that that action should be performed in response to identifying the media asset referenced in the extracted media asset identifiers; and
storing the action in the user preferences of the user.

6. The method of claim 1, further comprising:
determining a number of times the media asset was referred to in the interaction;
comparing the number to a threshold number;
determining whether the number is greater than the threshold number; and
automatically performing the action in response to determining that the number is greater than the threshold number.

7. The method of claim 1, further comprising:
determining a number of interactions in which the media asset was referred to;
comparing the number of interactions to a threshold number;
determining whether the number of interactions is greater than the threshold number; and
automatically performing the action in response to determining that the number of interactions is greater than the threshold number.

8. The method of claim 1, further comprising identifying the person with whom the user is interacting based on information received from at least one of the user's social contacts, the user's mobile device contacts, the user's e-mail contacts, and the user's messaging contacts.

9. The method of claim 1, further comprising:
determining whether the user has previously accessed the media asset; and
automatically performing the action in response to determining the user has not previously accessed the media asset.

10. The method of claim 1, further comprising:
generating for display, in response to the identifying, a plurality of actions associated with the media asset, wherein the plurality of actions comprise any combination of: setting a reminder for the media asset, recording the media asset, adding the media asset to a queue associated with the user, bookmarking the media asset, sending the user a link to information associated with the media asset, and adding the media asset to a list; and
receiving a user selection of the action from the plurality of actions.

11. A system for automatically performing an action on a recommended media asset, the system comprising:
storage circuitry configured to store a media asset database and user preferences of a user; and
control circuitry configured to:
receive data representing an interaction between the user and a person with whom the user is interacting;
process the received data to extract media asset identifiers;
compare the extracted media asset identifiers with a plurality of media assets in the media asset database;
identify a media asset, referenced in the extracted media asset identifiers, from the plurality of media assets based on the comparing;
retrieve, from the user preferences of the user, an action previously identified by the user; and
automatically perform the action on the media asset.

12. The system of claim 11, wherein the control circuitry is further configured to:
determine a level of interest in the media asset of at least one of the user and the person with whom the user is interacting based on the received data;
compare the level of interest to a threshold level;
determine whether the level of interest is above the threshold level based on comparing the level of interest to the threshold level; and
automatically perform the action in response to determining that the level of interest is above the threshold level.

13. The system of claim 12, wherein the control circuitry is configured to determine the level of interest by being configured to determine the level of interest based on a characterization of the media asset in the received data by at least one of the user and the person with whom the user is interacting.

14. The system of claim 11, wherein the control circuitry is further configured to:
retrieve, from a database of friends of the user, a recommendation weight corresponding to the person with whom the user is interacting;
compare the recommendation weight to a threshold weight;
determine whether the recommendation weight is above the threshold weight; and
determine whether to perform the action on the media asset in response to determining that the recommendation weight is above the threshold weight.

15. The system of claim 11, wherein the control circuitry is further configured to:
receive a user selection of the action indicating that that action should be performed in response to identifying the media asset referenced in the extracted media asset identifiers; and
store the action in the user preferences of the user.

16. The system of claim 11, wherein the control circuitry is further configured to:
determine a number of times the media asset was referred to in the interaction;
compare the number to a threshold number;
determine whether the number is greater than the threshold number; and
automatically perform the action in response to determining that the number is greater than the threshold number.

17. The system of claim 11, wherein the control circuitry is further configured to:
determine a number of interactions in which the media asset was referred to;
compare the number of interactions to a threshold number;
determine whether the number of interactions is greater than the threshold number; and automatically perform the action in response to determining that the number of interactions is greater than the threshold number.

18. The system of claim 11, wherein the control circuitry is further configured to identify the person with whom the user is interacting based on information received from at least one of the user's social contacts, the user's mobile device contacts, the user's e-mail contacts, and the user's messaging contacts.

19. The system of claim 11, wherein the control circuitry is further configured to:
determine whether the user has previously accessed the media asset; and
automatically perform the action in response to determining the user has not previously accessed the media asset.

20. The system of claim 11, wherein the control circuitry is further configured to:
generate for display, in response to the identifying, a plurality of actions associated with the media asset, wherein the plurality of actions comprise any combination of: setting a reminder for the media asset, recording the media asset, adding the media asset to a queue associated with the user, bookmarking the media asset, sending the user a link to information associated with the media asset, and adding the media asset to a list; and
receive a user selection of the action from the plurality of actions.

* * * * *